Aug. 10, 1971     A. PEACOCK     3,598,538

DIRECTLY HEATED GAS DISSOCIATOR

Filed Sept. 5, 1968

ARNOLD L. PEACOCK
INVENTOR

BY J. Theodosopoulos

AGENT

United States Patent Office 3,598,538
Patented Aug. 10, 1971

3,598,538
DIRECTLY HEATED GAS DISSOCIATOR
Arnold Peacock, Cape Elizabeth, Maine, assignor to
Sylvania Electric Products Inc.
Filed Sept. 5, 1968, Ser. No. 757,723
Int. Cl. B01j 7/00; H05b 3/02
U.S. Cl. 23—281                                     4 Claims

ABSTRACT OF THE DISCLOSURE

A gas dissociator includes a heating element made of refractory metal resistance wire and having a cyclical spiral shape. The gas is caused to flow turbulently through the element and is heated to its dissociation temperature. Efficient heat transfer from the element to the flowing gas results in substantially complete dissociation without the requirement of a catalyst.

BACKGROUND OF THE INVENTION

Field of the invention

This invention relates to gas dissociators wherein a gas, such as ammonia, is heated to a temperature sufficiently high to chemically dissociate it into its gaseous elemental components—hydrogen and nitrogen in the case of ammonia.

Description of the prior art

Ammonia dissociators generally have been indirectly heated, that is to say, the ammonia did not directly come into contact with the heating elements. The ammonia would be caused to flow through a dissociation chamber which was heated by external heaters. Within the chamber was a fill of permeable material, such as ceramic or metal balls, through which the ammonia flowed and could be heated to its dissociation temperature. Generally, in order to aid the dissociation process and carry it to substantial completion, the ceramic balls would be coated with a catalytic material, such as iron oxide, nickel salts or any other suitable nitriding metal.

The electrical efficiency of such a dissociator was generally low, since the heat from the resistive heaters had to be transferred first from the heaters to the walls of the dissociation chamber, then through the walls and finally to the catalytic fill. A substantial amount of heat was lost to the atmosphere from the outside walls of the dissociator. To minimize this heat loss resulting from indirect heating, heavy insulation and a massive structure were required.

Another disadvantage of the prior art dissociation chamber was that the efficiency of heat transfer from the catalytic fill to the ammonia gas decreased, with time, as the catalytic fill became contaminated. As this occurred the nitriding or dissociating ability of the catalyst also decreased which necessitated periodic replacement of the dissociation chamber.

SUMMARY OF THE INVENTION

This invention discloses a gas dissociator wherein the gas is directly heated by a heating element made of refractory metal resistance wire and having a cyclical spiral shape. Such a heating element is disclosed in copending application Ser. No. 674,823 now U.S. Pat. 3,551,643 filed on Oct. 12, 1967 by Pricenski et al. and assigned to the same assignee as the instant application.

The heating element is surrounded by a suitable cylindrical insulating tube, preferably ceramic, and the gas is caused to flow into one end of the tube, through the heating element substantially normally to the individual turns thereof and out the other end of the tube. The heating element is made of coiled resistance wire wherein each individual turn is spaced from adjacent turns and has a suitable polygonal shape such as, for example, approximately rectangular. However each turn, although coaxial, is radially offset from the adjacent turns, so that the curve resulting from an imaginary line connecting the same peripheral points on successive turns is a spiral about the axis of the heating element. An end view of the element, that is, along the axis, gives the appearance of a thick walled cylindrical shell, the inside diameter of which is approximately equal to the width of a rectangular turn and the outside diameter of which is slightly greater than the approximate length. Preferably, a suitable plug is inserted into the core of the element so that the mutual action thereof with the coaxial cylindrical tube surrounding the outside of the element substantially prevents any gas flow straight through, or outside the periphery of, the element. The turbulence and obstruction caused by the repetitive series of directly heated turns results in high efficiency of heat transfer to the gas.

During operation, the heater is maintained at a temperature sufficient to raise the temperature of the gas flowing therethrough to at least its effective dissociation temperature, which, in the case of ammonia, is about 1700° F.

Preferably, the heating element and surrounding tube are disposed within a suitable container having an inlet and an outlet. Preferably, also, the gas passages within the container are constructed so that heat is transferred from the hot effluent dissociated gas to the incoming gas. For example, after the hot dissociated gas flows out of the ceramic tube, it can be caused to flow through a passageway surrounding the ceramic tube before it flows out of the outlet of the container. However, heat transfer tubing may also be disposed within the passageway and the incoming gas can then be caused to flow through this tubing before said gas enters the ceramic tube. Thus, heat from the hot dissociated gas would be transferred through the walls of the tubing to the cooler incoming gas. Preferably, in such a construction, the heat transfer tubing has a coiled shape and is disposed in the passageway concentrically with the ceramic tube. Thus, because of the long travel of the incoming gas through the coiled tubing, the efficiency of heat transfer from the hot dissociated gas to the incoming gas is relatively high.

If desired, two or more heating elements, each within a ceramic tube, may be used within one dissociator to increase its capacity. In such a case, the incoming gas would flow through coiled tubing surrounding the ceramic tubes and then into a collection chamber from which approximately equal amounts of the gas would flow through each heating element and be dissociated. The dissociated gas would then flow into another collection chamber, thence into the passageway in which the coiled tubing is located and finally out of the outlet of the dissociator.

BRIEF DESCRIPTION OF FIG. 1

DESCRIPTION OF THE PREFERRED EMBODIMENT

Figure 1:
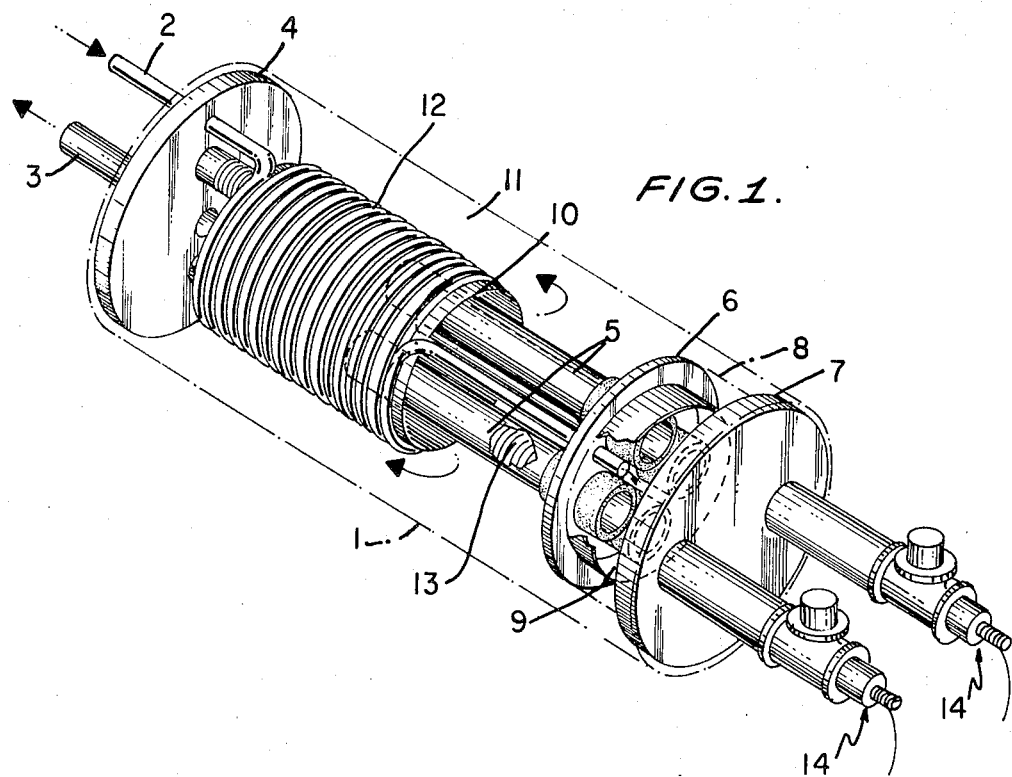
FIG. 1 is a perspective view of a gas dissociator in accordance with this invention. The container is shown in phantom and sections of the drawing are cut away to show the insulating tube, heating element, heat transfer tubing and collection chamber.
Figure 2:
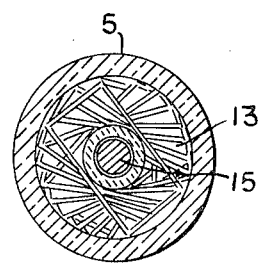
FIG. 2 is a cross sectional view of the insulating tube and heating element, showing an polygonal shape for the heating element.

As shown in the drawing, one embodiment of a gas dissociator in accordance with this invention rated at 300 cubic feet per hour of dissociated ammonia, comprises a closed cylindrical container 1 having an inlet 2 and an outlet 3. Container 1 is made of stainless steel tubing and is about 4 inches diameter by 12 inches long. The provision for inlet 2 is a ⅜ inch diameter hole through end cap 4, end cap 4 being welded to, and sealing, one end of container 1. Outlet 3 is ⅞ inch diameter stainless steel tube, protruding externally about 4 inches, and is welded to the center of, and passes through, end cap 4.

Axially disposed within container 4 is a cluster of four open-ended aluminum oxide tubes 5, each tube being about 7 inches long and having an inside diameter of ½ inch. Tubes 5 are supported by, and pass through, circular plate 6 which, in turn is fastened to end cap 7. End cap 7 is welded to, and seals, the opposite end of container 1. Plate 6 is about 3½ inches in diameter and is fastened to end cap 7 by means of coaxially positioned cylindrical shell 8. That is, plate 6 is welded, and sealed, to one end of shell 8 and the other end of shell 8 is welded, and sealed, to end cap 7. The resultant hermetically sealed collection chamber 9, enclosed by end cap 7, shell 8 and plate 6, is about 2½ inches long by 3 inches diameter. Tubes 5 protrude through plate 6 and into collection chamber 9 a distance of about 1½ inches.

The opposite ends of tubes 5 extend into a molybdenum cup 10, the purpose of which is to direct the gas flow, as will be explained later. Cup 10 can be made of any suitable refractory metal and is about 5½ inches long by 2¾ inches diameter and has a closed end. Cup 10 is coaxially supported within container 1 by means of two bolts at said closed end which are fastened to end cap 8 and which space cup 10 about 1 inch therefrom.

The cylindrical space between cup 10 and the inner surface of container 1 comprises an annular passageway 11. Disposed within passageway 11 is a heat exchanger 12 made of ⅜ inch stainless steel tubing which is coiled at essentially 100% pitch around cup 10. One end of the tubing passes through the ⅜ inch diameter hole in end cap 4 and is sealed thereto, to comprise inlet 2. The other end of the tubing passes through plate 6, to which it is sealed, and extends into collection chamber 9.

Disposed within each of tubes 5 is a heating element 13 made of 27.5 mil tungsten wire. Tungsten is preferred because of its high melting point and good dimensional stability after it has been stabilized. In addition, it is self-regulating in that its electrical resistance increases with temperature. The individual turns of element 13 form a cyclical, spiral arrangement, as mentioned in Summary of the Invention; the body of element 13 is 3½ inches long and contains 40 approximately triangular turns. The outer diameter of element 13 corresponds closely to the inner diameter of tube 5 to provide the desired turbulence of gas flow therethrough. The inside diameter of element 13 is 0.155 inch and gas flow therethrough is prevented by an aluminum oxide plug 15 therein. Ceramic tubes 5 are about double the length of the body of heating elements 13; therefore, elements 13 are positioned within tubes 5 closer to the ends that protrude into collection chamber 9 for more efficient heat transfer. All four heating elements 13 are electrically connected in series by suitably connecting the element legs. Each element 13 has two oppositely extending legs which protrude just beyond the ends of tubes 5; the necessary electrical connections are made at the ends of the legs. Two lead-in wires, connected to heating elements 13, extend through end cap 7 and are connected to two suitable external electrical terminals 14. The lead-in wires are electrically insulated from end cap 7 but are hermetically sealed therewith.

In operation, gaseous ammonia is introduced to the dissociator at inlet 2 and flows through heat exchanger 12 and thence into collection chamber 9. The flow then divides substantially equally into the four parallel ceramic tubes 5 and associated heating elements 13. Heating elements 13 are maintained at a temperature sufficient to raise the ammonia temperature to about 1700° F. In one case, where 100 cubic feet per hour of dissociated ammonia was produced, the element temperature was about 3000° F. at its hot end and required 1845 watts of electrical power.

After flowing out of tubes 5, the dissociated ammonia is diverted by cup 10 into passageway 11 where it flows around heat exchanger 12, thereby transferring heat to the incoming gas flowing through heat exchanger 12. The dissociated ammonia then flows out of outlet 3.

All necessary joints and connections are hermetically sealed to insure proper gas flow, as described, without leaks.

If desired, container 1 may itself be enclosed in a larger suitable container, with insulation therebetween, to reduce heat losses and provide a lower outer wall temperature.

I claim:
1. A gas dissociator comprising:
   (1) a container having an inlet and an outlet;
   (2) at least two elongated heating elements, parallel to each other, disposed within said container, each of said elements comprising a continuous length of coiled resistance wire, the individual turns of said coiled wire having a substantially polygonal shape and being radially displaced from adjacent turns and adapted to cause turbulence in gas flowing therethrough;
   (3) a plug disposed in the core of each of said elements to prevent gas flow therethrough;
   (4) elongated insulated tubes disposed within said container, parallel to each other, each of said insulated tubes surrounding one of said heating elements so as to be in physical contact with the peripheral points thereof;
   (5) means to cause incoming gas entering said inlet to flow through said insulating tubes and said heating elements and thence through said outlet, said means including a passageway disposed between said insulating tubes and the wall of said container and further including heat transfer tubing disposed within said passageway, said tubing being arranged so that incoming gases are caused to flow therethrough prior to entering and flowing through said insulating tube, said passageway being arranged to conduct gases from said insulating tube to said outlet, said means further including a collection chamber at one end of said insulating tubes, said chamber being arranged to distribute gas flow substantially equally to each of said tubes;
   (6) and means to electrically energize said heating elements.

2. The dissociator of claim 1 wherein said resistance wire is essentially tungsten.

3. The dissociator of claim 1 wherein said insulating tube is ceramic.

4. The dissociator of claim 1 wherein said heat transfer tubing comprises heat-resistant metal and is concentrically coiled about said insulating tube.

References Cited

UNITED STATES PATENTS

| | | | |
|---|---|---|---|
| 1,639,272 | 8/1927 | Reed | 23—288.8 |
| 1,642,624 | 9/1927 | Northrup | 23—288.8X |
| 1,769,873 | 7/1930 | Williams | 23—288.8X |
| 2,013,652 | 9/1935 | Hall | 23—288.8X |
| 2,167,471 | 7/1939 | Auerbach | 23—277X |

JOSEPH SCOVRONEK, Primary Examiner

U.S. Cl. X.R.

23—252, 284, 288J; 219—374, 381; 252—374